(12) United States Patent
Law et al.

(10) Patent No.: US 7,712,031 B2
(45) Date of Patent: May 4, 2010

(54) SYSTEM AND PROCESS FOR DEVELOPING A VOICE APPLICATION

(75) Inventors: Eng Boon Law, Hawthorn (AU); Khanh Thi Phuong Ho, Box Hill North (AU); Alvaro Kau Kam Hui, Templestowe (AU); Bradford Craig Starkie, Surrey Hills (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 531 days.

(21) Appl. No.: 10/523,128

(22) PCT Filed: Jul. 24, 2003

(86) PCT No.: PCT/AU03/00939

§ 371 (c)(1),
(2), (4) Date: Jan. 21, 2005

(87) PCT Pub. No.: WO2004/010678

PCT Pub. Date: Jan. 29, 2004

(65) Prior Publication Data

US 2006/0025997 A1  Feb. 2, 2006

(30) Foreign Application Priority Data

Jul. 24, 2002  (AU) .............................. 2002950336

(51) Int. Cl.
*G06F 3/16* (2006.01)

(52) U.S. Cl. .................. 715/728; 715/730; 704/270; 704/270.1; 709/230; 709/217

(58) Field of Classification Search ................. 704/257, 704/270, 271, 270.1; 715/728, 730; 709/203, 709/217; 705/34, 40, 51–53
See application file for complete search history.

(56) References Cited

U.S. PATENT DOCUMENTS 5,241,619 A  8/1993  Schwartz et al.

(Continued)

FOREIGN PATENT DOCUMENTS

EP  0 312 209 B1  11/1992

(Continued)

OTHER PUBLICATIONS

*Voxeo Designer 2.0* web page, as of Feb. 5, 2002, http://web.archive.org/web/20020205091431/community.voxeo.com/vd2.jsp.

(Continued)

*Primary Examiner*—Vijay B Chawan
(74) *Attorney, Agent, or Firm*—Dorsey & Whitney LLP

(57) ABSTRACT

A system for use in developing a voice application, including a dialog element selector for defining execution paths of the application by selecting dialog elements and adding the dialog elements to a tree structure, each path through the tree structure representing one of the execution paths, a dialog element generator for generating the dialog elements on the basis of predetermined templates and properties of the dialog elements, the properties received from a user of the system, each of said dialog elements corresponding to at least one voice language template, and a code generator for generating at least one voice language module for the application on the basis of said at least one voice language template and said properties. The voice language templates include VoiceXML elements, and the dialog elements can be regenerated from the voice language module. The voice language module can be used to provide the voice application for an IVR.

22 Claims, 5 Drawing Sheets

U.S. PATENT DOCUMENTS

| | | | |
|---|---|---|---|
| 5,452,397 | A | 9/1995 | Ittycheriah et al. |
| 5,642,519 | A | 6/1997 | Martin |
| 5,737,723 | A | 4/1998 | Riley et al. |
| 5,860,063 | A | 1/1999 | Gorin et al. |
| 5,937,385 | A | 8/1999 | Zadrozny et al. |
| 6,016,470 | A | 1/2000 | Shu |
| 6,044,347 | A | 3/2000 | Abella et al. |
| 6,144,938 | A | 11/2000 | Surace et al. |
| 6,154,722 | A | 11/2000 | Bellegarda |
| 6,173,261 | B1 | 1/2001 | Arai et al. |
| 6,269,336 | B1 | 7/2001 | Ladd et al. |
| 6,314,402 | B1 | 11/2001 | Monaco et al. |
| 6,321,198 | B1 | 11/2001 | Hank et al. |
| 6,411,952 | B1 | 6/2002 | Bharat et al. |
| 6,434,521 | B1 | 8/2002 | Barnard |
| 6,493,673 | B1 | 12/2002 | Ladd et al. |
| 6,510,411 | B1 | 1/2003 | Norton et al. |
| 6,523,016 | B1 | 2/2003 | Michalski |
| 6,587,822 | B2 | 7/2003 | Brown et al. |
| 6,604,075 | B1 | 8/2003 | Brown et al. |
| 6,618,697 | B1 | 9/2003 | Kantrowitz et al. |
| 6,684,183 | B1 | 1/2004 | Korall et al. |
| 2001/0013001 | A1 | 8/2001 | Brown et al. |
| 2001/0016074 | A1 | 8/2001 | Hamamura |
| 2002/0087325 | A1 | 7/2002 | Lee et al. |
| 2002/0188454 | A1 | 12/2002 | Sauber |
| 2003/0007609 | A1 | 1/2003 | Yuen et al. |
| 2003/0055651 | A1* | 3/2003 | Pfeiffer et al. ........... 704/270.1 |
| 2003/0069729 | A1 | 4/2003 | Bickley et al. |
| 2004/0015350 | A1 | 1/2004 | Gandhi et al. |
| 2005/0091057 | A1 | 4/2005 | Phillips et al. |
| 2006/0025997 | A1 | 2/2006 | Law et al. |
| 2006/0190252 | A1 | 8/2006 | Starkie |
| 2006/0203980 | A1 | 9/2006 | Starkie |
| 2008/0126089 | A1 | 5/2008 | Printz et al. |
| 2008/0319738 | A1 | 12/2008 | Liu et al. |

FOREIGN PATENT DOCUMENTS

| | | |
|---|---|---|
| EP | 0 685 955 A2 | 12/1995 |
| EP | 0 700 031 A1 | 3/1996 |
| EP | 0 890 942 A2 | 1/1999 |
| EP | 0 992 980 A2 | 4/2000 |
| EP | 1 207 518 A2 | 5/2002 |
| WO | WO 98/50907 A1 | 11/1998 |
| WO | WO 00/05708 A1 | 2/2000 |
| WO | WO 00/51016 A1 | 8/2000 |
| WO | WO 00/078022 A1 | 12/2000 |
| WO | WO 02/37268 A2 | 5/2002 |
| WO | WO 02/063460 A2 | 8/2002 |
| WO | WO 02/103673 A1 | 12/2002 |
| WO | WO 2004/010678 A1 | 1/2004 |

OTHER PUBLICATIONS

*Telera AppBuilder* Data Sheet, Mar. 20, 2002, http://www.telera.com/stageone/files/Telera/collateral/app_builder_3-20_hi.pdf.

*The Voice Web Application Development Environment*, Telera White Paper, Aug. 2001, http://www.telera.com/stageone/files/Telera/collateral/AppDev_WP_4-18-02.pdf.

*Nuance V-Builder* web page, as of Feb. 1, 2002, http://web.archive.org/web/20020201161856/www.nuance.com/products/vbuilder.html.

*Nuance V-Builder 2.0 NVP Edition Technical Data Sheet*, Nov. 25, 2002, http://www.nuance.com/assets/pdf/vbuilder_tech_data_sheet_1102.pdf.

Ahonen, H., et al., "*Forming Grammars For Structured Documents: An Application Of Grammatical Inference*," Procedure of the Second International Colloquium on Grammatical Inference and Applications, (1994) pp. 153-167.

Frost, R.A., "*Speechnet: A Network of Hyperlinked Speech-Accessible Objects*," International Conference on Advanced Issues of E-Commerce and Web-Based Information Systems, WECWIS, Ontario, Canada, (Apr. 8-9, 1999) pp. 116-121.

Gold, E. M., "*Language Identification in the Limit*," Academic Press (1967), pp. 447-474.

Hunt, A., et al., Speech Recognition Grammer Specification Version 1.0 <http://www.w3.org/TR/Speech-grammar/>, W3C Recommendation, (2004) pp. 1-94.

Minker, W., "*Stochastic Versus Rule-Based Speech Understanding For Information Retrieval*," Speech Communications 25, Spoken Language Processing Group, LIMSI-CNRS, Orsay Cedex, France, (1998) pp. 223-247.

Nevill, C., et al., "*Compression and Explanation Using Hierarchical Grammars*," Computer Science Department, University of Waikato, New Zealand, The Computer Journal, vol. 40, No. 2/3, (1997) pp. 103-116.

Ramming, J. C., "*PML: A Language Interface to Distributed Voice-Response Units*," Lecture Notes in Computer Science, vol. 1686, (1998) pp. 97-112.

Stolcke, A., "*Bayesian Learning of Probabilistic Language Models*," Dissertation, University of California at Berley, (1994) pp. 1-84.

Thomas, I., et al., "*Extracting Phoneme Pronunciation Information from Corpara*," Proceedings of the Joint Conference on New Methods in Language Processing and Computational Language Learning, Association for Computational Linguistics, Somerset, New Jersey, (1998) pp. 175-183.

Van Zaanen, M., "*Bootstrapping Structure into Language: Alignment-Based Learning*," Phd Thesis, The University of Leeds School of Computing, (2001), pp. i-xi and 1-128.

VoiceXML Forum, <http://www.voicexml.org>, (2007) pp. 1-2.

Allen, J., "*Natural Language Understanding*," The Benjamin/Cummings Publishing Company Inc., Redwood City, CA USA (1995) pp. 46-53.

Garofolo, J., et al., "*The DARPA TIMIT Acoustic-Phonetic Continuous Speech Corpus*," NIST Speech Disc CD1-1.1, (Oct. 1990) pp. 342.

Levenstein, V. I., "*Binary Codes Capable of Correcting Deletions, Insertions, and Reversals*," Soviet Physics-Doklady, vol. 10, No. 9, (Feb. 1966) pp. 707-710.

Mitchell, T. M., "*Machine Learning*," Chapter 7. Computational Learning Theory, McGraw-Hill, Boston, MA USA (1997) pp. 201-227.

Rabiner, L. R., et al., "*Fundamentals of Speech Recognition*," Chapter 2. The Speech Signal: Production, Perception, and Acoustic-Phonetic Characterization, Prentice Hall, Englewood Cliffs, New Jersey USA (1993) pp. 11-37.

Ryan, T. P., "*Modern Regression Methods*," John Wiley and Sons, Inc. (1996) pp. 21-30.

Aho, A. V., et al., "*The Theory of Parsing, Translation, and Compiling*," Prentice-Hall, Englewood Cliffs, New Jersey, (1972) p. 146.

Angluin, D., "*Inference of Reversible Languages*," Journal of the Association for Computational Machinery, vol. 29, No. 3, (1982) pp. 741-765.

Knuth, D. E., "*Semantics of Context-Free Languages*," orginially published in Mathematical Systems Theory 2, (1968) pp. 127-145, republished in "Selected Papers in Computer Languages," CSLI Publications, Center for the Study of Languages and Information, (2003) pp. 377-400.

Harris, Z. S., "*Structural Linguistics*," University of Chicago Press, Chicago, IL, USA and London, UK, 7th edition (1966), formerly entitled: "*Methods in Structural Linguistics*," (1951) pp. 243-299.

ISO/IEC 13211-1:1995, "*Information Technology—Programming languages—Prolo—Part 1: General core*," International Organization for Standardization, New York, New York, (1995) pp. 1-199.

Oates, T., et al., "*Learning k-Reversible Context Free Grammars from Positive Structural Examples*," Department of Computer Science and Electrical Engineering, University of Maryland Baltimore County, Baltimore, MD, pp. 1-7.

Sakakibara, Y., "*Efficient Learning of Context-Free Grammars from Positive Structural Examples*," Information and Computation 97, (1992) pp. 23-60.

Starkie, B., "*Inferring Attribute Grammars with Structured Data for Natural Language Processing*," 6th International Colloquium, ICGI 2002, Berlin Germany: Springer-Verlag, (2002) pp. 1-12.

Starkie, et al., *Lyrebird: Developing Spoken Dialog Systems Using Examples*, Telstra New Wave Pty Ltd., Jan. 1, 2002 XP-002519592, URL: http://www.springerlink.com/content/9fq6d51u0mqa7mtj/>, pp. 1-3.

Starkie, *Programming Spoken Dialogs Using Grammatical Inference*, Telstra New Wave Pty Ltd., AI 2001 Advances in Artificial Intelligence, XP002519591, pp. 449-460.

\* cited by examiner

US 7,712,031 B2

SYSTEM AND PROCESS FOR DEVELOPING A VOICE APPLICATION

FIELD OF THE INVENTION

The present invention relates to a system and process for generating a voice application.

BACKGROUND

A voice application is a software application that provides an interactive audio interface, particularly a speech interface, on a machine, such as an Interactive Voice Response (IVR) system. IVRs, such as Intel's Dialogic™ IVR, are used in communications networks to receive voice calls from parties. The IVR is able to generate and send voice prompts to a party and receive and interpret the party's responses made in reply.

Voice extensible markup language, or VoiceXML, is a markup language for voice or speech-driven applications. VoiceXML is used for developing speech-based telephony applications, and also enables web-based content to be accessed via voice using a telephone. VoiceXML is being developed by the VoiceXML Forum, Due to the verbose nature of voiceXML, it can be cumbersome to develop VoiceXML-based applications manually using a text or XML editor. Consequently, voice application development systems are available that allow voice applications to be developed by manipulating graphical elements via a graphical user interface rather than coding VoiceXML directly. However, these systems are limited in their ability to assist a developer. It is desired to provide a process and system for developing a voice application that improves upon the prior art, or at least provide a useful alternative to existing voice application development systems and processes.

SUMMARY OF THE INVENTION

In accordance with the present invention, there is provided a process for developing a voice application, including:
 generating graphical user interface components for defining execution paths of said application by arranging dialog elements in a tree structure, each path through said tree structure representing one of said execution paths;
 generating said dialog elements on the basis of predetermined templates and properties of said dialog elements, said properties received from a user via said graphical user interface components, each of said dialog elements corresponding to at least one voice language template; and
 generating at least one voice language module for said application on the basis of said at least one voice language template and said properties.

The present invention also provides a system for use in developing a voice application, including:
 a dialog element selector for defining execution paths of said application by selecting dialog elements and adding said dialog elements to a tree structure, each path through said tree structure representing one of said execution paths;
 a dialog element generator for generating said dialog elements on the basis of predetermined templates and properties of said dialog elements, said properties received from a user of said system, each of said dialog elements corresponding to at least one voice language template; and
 a code generator for generating at least one voice language module for said application on the basis of said at least one voice language template and said properties.

The present invention also provides a graphical user interface for use in developing a voice application, said interface including graphical user interface components for defining execution paths of said application by arranging configurable dialog elements in a tree structure, each path through said tree structure representing one of said execution paths, and said dialog element components may include one or more of:
 a start dialog component for defining the start of said application;
 a variables component for use in defining variables for said application;
 a menu component for defining a menu;
 a menu choice component for defining a choice of said menu;
 a decision component for defining a decision branching point;
 a decision branch component for defining a test condition and an execution branch of said decision branching point;
 a form component for defining a form to collect input from a caller;
 a record component for recording audio
 a speaker component for playing prompts,
 a local processing component for defining local processing;
 a remote processing component for performing processing on a remote system;
 a loop component for defining an execution loop;
 a loop call component for calling said loop;
 a loop next component for proceeding to the next cycle of said loop;
 a loop break component for breaking out of said loop;
 a subroutine component for defining a subroutine;
 a subroutine call component for calling said subroutine;
 subroutine return component for returning from said subroutine;
 a jump component for defining a non-sequential execution path to a dialog element
 a transfer component representing the transfer of a call to another number
 a hotwords component for defining a word or phrase and a non-sequential execution path to a dialog element to be followed upon receipt of said word or phrase; and
 an end component for defining an end of said application.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENT

Figure 1:
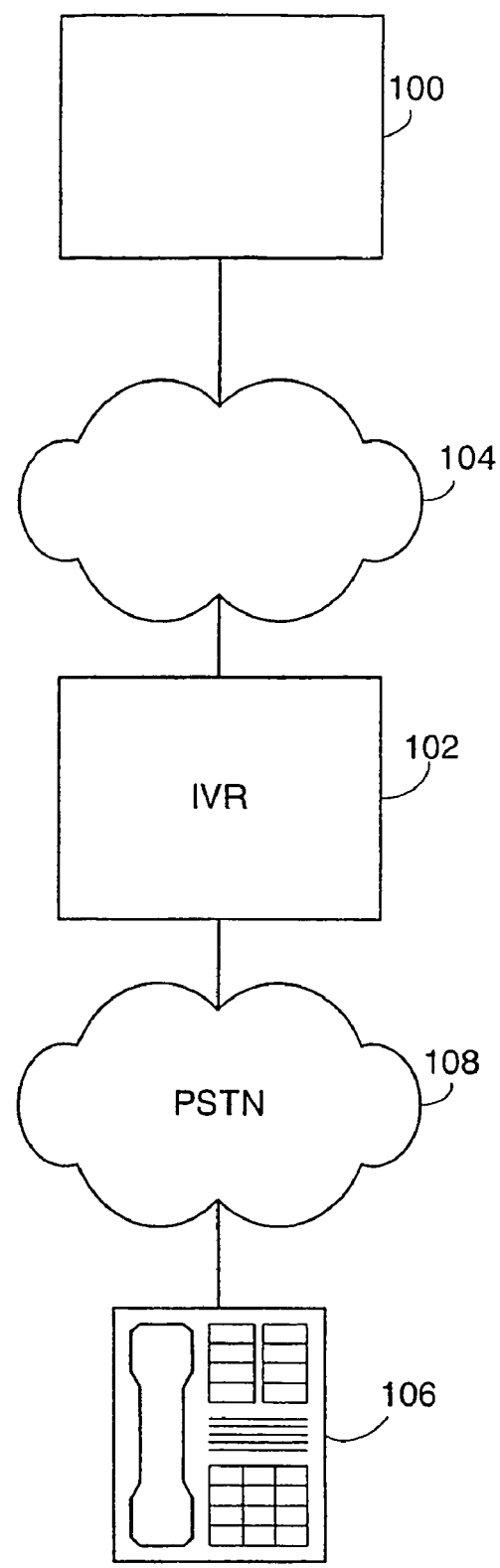
FIG. 1 is a block diagram showing a preferred embodiment of a voice application development system connected to an IVR via a network, and a telephone connected to the IVR via the PSTN.

As shown in FIG. 1, a voice application development system 100 can be connected to a VoiceXML-enabled interactive voice response system (IVR) 102 via a communications network 104. The system 100 executes a voice application development process which allows an application developer to develop a speech based application using a graphical user interface of the system 100. The application can then be transferred to the IVR 102 via the network 104. A standard telephone 106 can be used to access the IVR 102 via the public switched telephone network (PSTN) 108, allowing a user of the telephone 106 to interact with the speech based application simply by speaking into the telephone 106 to provide speech input to the application in response to voice prompts provided by the IVR 102 from the application. In the described embodiment, the voice application development system 100 is a standard computer system, such as an Intel™-based personal computer running a Microsoft Windows™ operating system, and the voice application development process is implemented by software modules stored on hard disk storage of the voice application development system 100. However, it will be apparent to those skilled in the art that at least parts of the voice application development process can be alternatively implemented by dedicated hardware components such as application-specific integrated circuits (ASICs). The voice application runs on the IVR 102, which may be an Intel Dialogic™ IVR with Nuance's Voice Web Server™ software. The network 104 may be any secure communications network that enables voice applications to be loaded onto the IVR 102, such as an Ethernet LAN or TCP/IP network.

Figure 2:
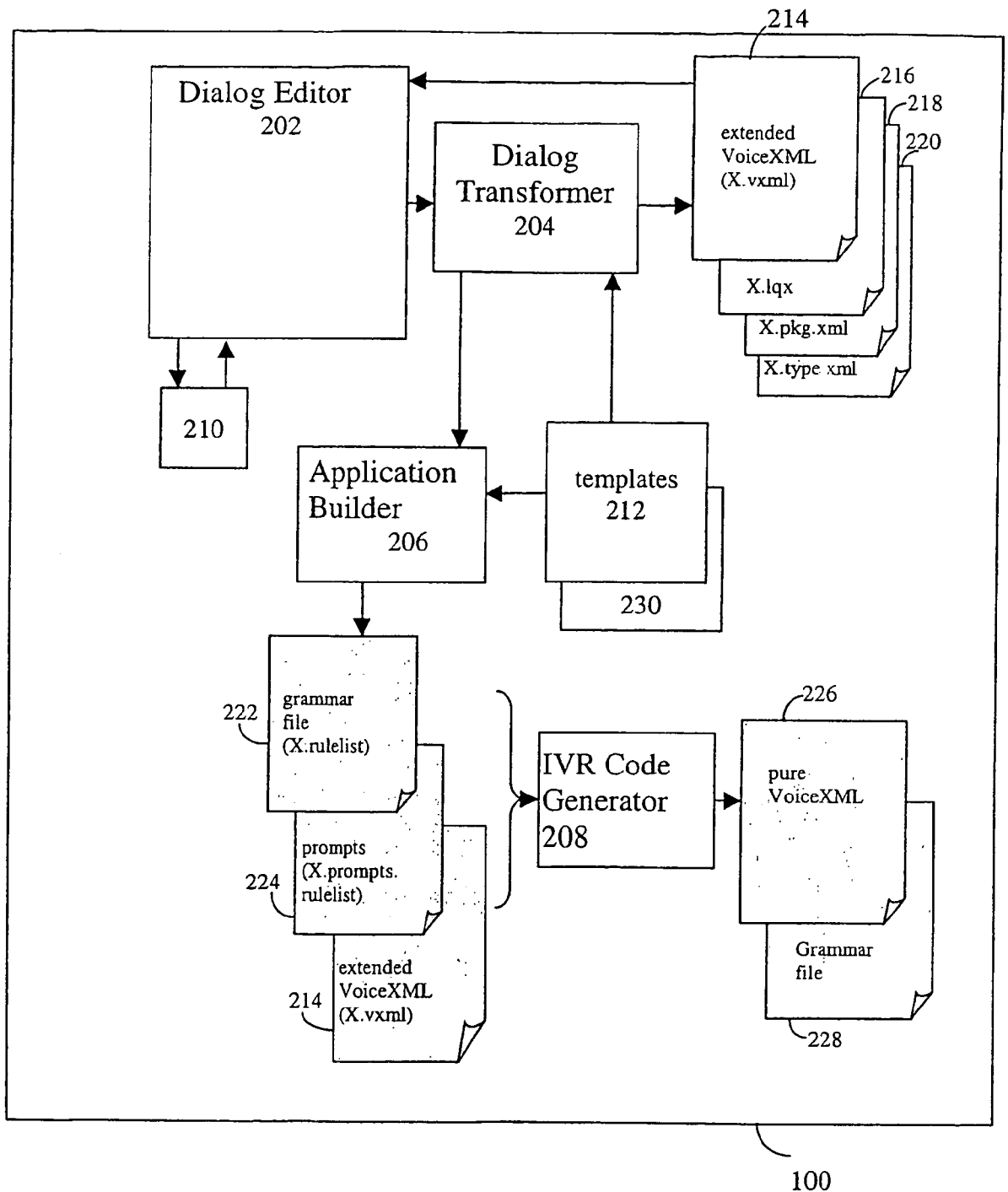
FIG. 2 is a schematic diagram of the voice application development system, showing how a voice application is developed.
Figure 3:
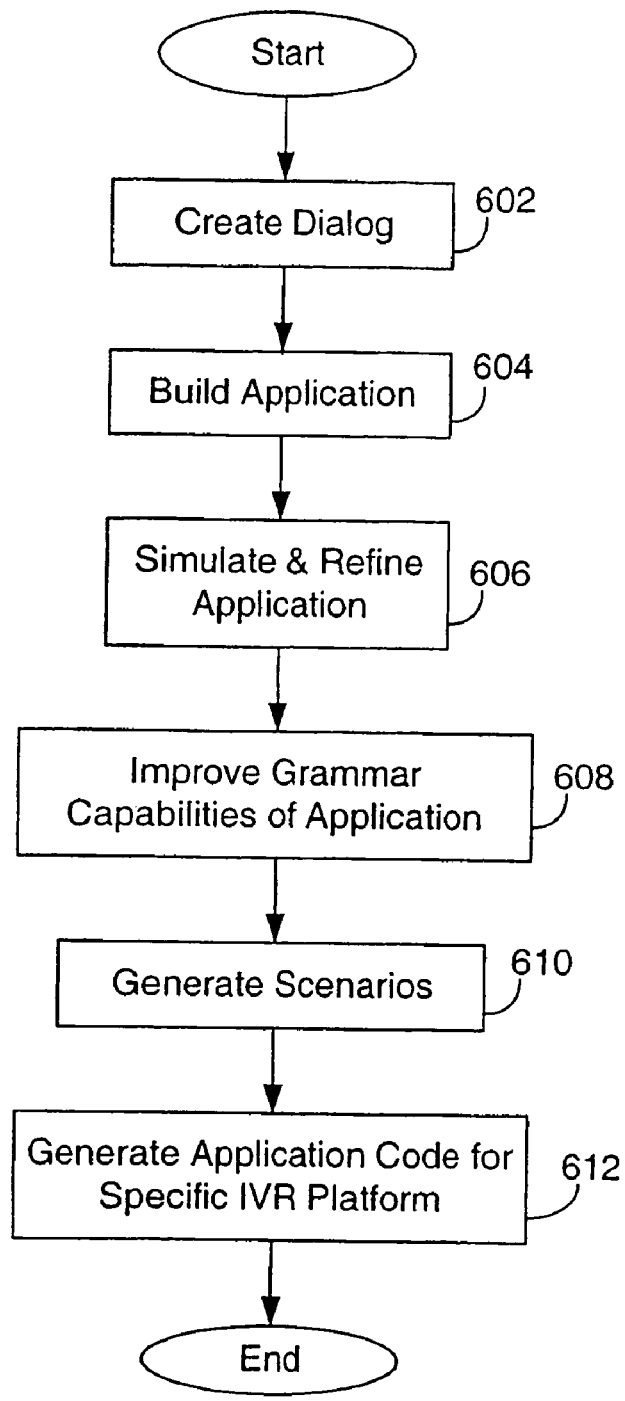
FIG. 3 is a flow diagram of a voice application development process executed by the system.

As shown in FIG. 2, the voice application development system 100 includes a dialog editor module 202, a dialog transformer module 204, an application builder module 206, an CR code generator 208, other application development modules 210, VoiceXML templates 212, and EMCAscript templates 230. The voice application development system 100 constitutes an integrated development environment (IDE) for the development of speech based applications. The system 100 executes an application development process, as shown in FIG. 3, that allows a user of the system 100 to develop a voice application for a particular IVR platform.

Figure 4:
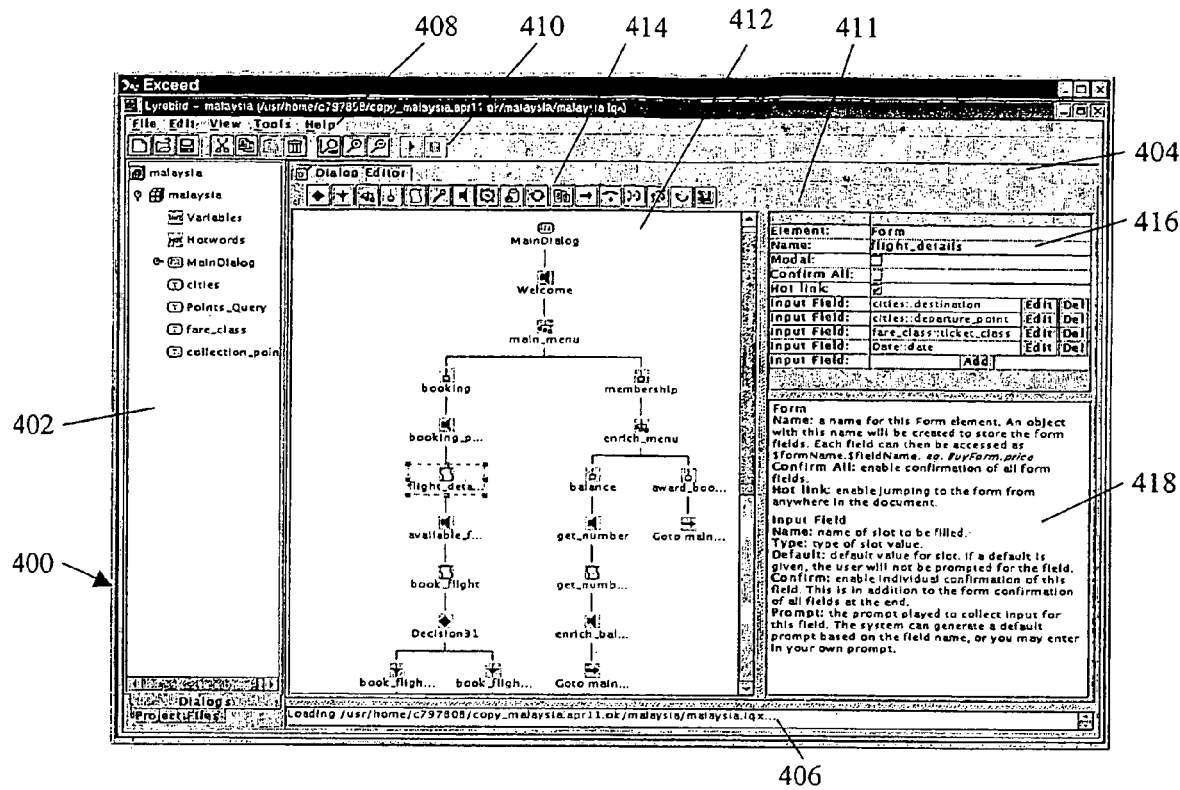
FIG. 4 is a screenshot of a graphical user interface of the voice application development system.

When the process begins, the system 100 generates a graphical user interface, as shown in FIG. 4. The interface is in the form of a window 400 with a project pane 402, a tools pane 404, and a messages pane 406. The window 400 also includes a main menubar 408 and a main toolbar 410. The main menubar 408 includes a Tools menu that provides access to a number of modules of the system 100 that are used to develop voice applications, as described below, and the tools pane 404 provides an interface to each tool when that tool is executed.

To develop a speech based application, a user of the system 100 can create a new project or open a saved project by selecting a corresponding menu item from the "Files" menu of the main menubar 408. The dialog editor 202 is then executed, and a tabbed dialog panel 411 is added to the tools pane 404, providing an interface to the dialog editor 202, and allowing the user to define an execution flow, referred to as a dialog, for the application. The dialog panel 411 includes a dialog pane 412, a dialog element toolbar 414 referred to as the dialog palette, a dialog element properties pane 416, and a dialog element help pane 418.

Figure 5:
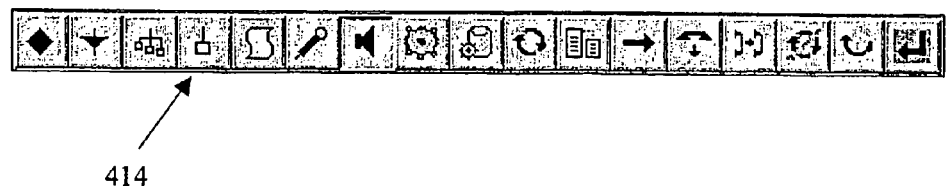
FIG. 5 is a screenshot of a dialog element selection bar of the graphical user interface.

An application can be built from a set of seventeen dialog elements represented by icons in the dialog palette 414, as shown in FIGS. 4 and 5. Each element represents a complete or partial component of the voice application, such as a menu, a menu choice, a form, an execution loop, a speech prompt, and so on. The full set of dialog components is given in Appendix A. A dialog element is added to the dialog by selecting the element from the dialog palette 414 using a pointing device of the system 100 such as a mouse or tablet, and placing the selected dialog element on the dialog editor pane 412 using a drag-and-drop action. Each dialog element has a number of properties that can be set by the user. Once placed in the dialog editor pane 412, an instance of the selected dialog element is added to the dialog and its properties can be set. When a dialog element instance in the dialog editor pane 412 is selected, its property names and associated values are displayed in the properties pane 416. The properties pane displays the name of each property, and includes controls such as check boxes and buttons to allow the user to modify the values of existing properties, and to add or delete new properties. The dialog element help pane 418 displays help information for the selected element, facilitating the rapid development of the application.

The execution flow of the application is defined by adding dialog elements to the dialog editor pane 412, setting the properties of the dialog elements, and defining the execution order of the dialog elements. The latter is achieved by dragging a dialog element and dropping it on top of an existing dialog element in the dialog editor pane 412. The dropped element becomes the next element to be executed after the element that it was dropped onto. The sequence and properties of dialog elements on the dialog editor pane 412 defines a dialog. Thus a dialog represents the execution flow of a voice application as a sequence of dialog elements. This sequence represents the main flow of the application and provides a higher-level logical view of the application that is not readily evident from the application's VoiceXML code. Thus the dialog provides a clear and logical view of the execution of the application. In addition to the main flow, non-sequential execution branches can be created by using a Jump dialog element. However, such non-sequential execution is not represented in a dialog. A subroutine is represented by an icon in the project pane 402 and appears as an icon in the dialog editor pane 412 when the main dialog is displayed. The execution flow of a subroutine can be displayed by selecting its icon in the project pane 402.

The sequencing of a dialog is facilitated by enforcing strict rules on dialog elements and by including explicit links in the dialog code to transition from one dialog element to the next. In contrast to arbitrary VoiceXML code whose execution can be completely non-sequential due to the presence of "GOTO" tags, a dialog generated by the system 100 has a tree structure, with each path through the tree representing a possible path of dialog execution. This allows the dialog flow to be readily determined and displayed using high level graphical dialog elements, which would be much more difficult with arbitrary VoiceXML.

An application can be saved at any time by selecting a "Save" menu item of the "File" menu of the menubar 410. When an application is saved, the application dialog is translated into an extended VoiceXML format by the dialog transformer 204. Each dialog element in the dialog flow is first translated into corresponding VoiceXML code. Each of the seventeen dialog elements corresponds to one of the seventeen VoiceXML templates 212 that performs the functionality of that element. A VoiceXML template is a sequence of VoiceXML elements that produces the behaviour that the dialog element represents. It is a template because it needs to be configured by the element properties (e.g., name, test condition) which are set by the user, as described above.

Some dialog elements correspond to similar VoiceXML elements (e.g., a Menu dialog element corresponds to a VoiceXML <menu> element), while others map onto a complex sequence of VoiceXML elements (e.g., a Loop dialog element corresponds to multiple VoiceXML <form> elements, each form specifying the next form to execute in an iterative loop). However, even dialog elements that correspond to similar VoiceXML elements represent more functionality than the equivalent VoiceXML element. For example, a Menu dialog element allows prompts to be set by the user, and the Menu dialog element actually maps onto a block of VoiceXML code that contains a <menu> element with embedded <prompt>, <audio>, and other XML elements.

Each dialog element's VoiceXML template is separate from the next and can be sequenced to produce the dialog flow. The sequencing is achieved by a reference at the bottom of each element's template to the next element's template, which causes the templates to be executed in the desired order.

The translation from high-level dialog elements into VoiceXML proceeds as follows. The dialog elements are stored in a tree structure, each branch of the tree corresponding to a path in the dialog flow. The tree is traversed in pre-order traversal to convert each element visited into VoiceXML. For each visited dialog element, VoiceXML code is generated from its corresponding VoiceXML template by filling in the missing or configurable parts of the template using the element properties set by the user, and adding a link to the next element's VoiceXML code at the bottom of the current element's generated VoiceXML code.

Although the forward transformation from dialog flow to VoiceXML is relatively straightforward, the reverse transformation from VoiceXML to dialog flow is more difficult. The sequencing of dialog elements can be recreated from the generated VoiceXML, but property settings for the elements may not be available because some information in the dialog elements is lost when they are converted to VoiceXML. This lost information may not fall within the scope of VoiceXML, and hence, cannot be naturally saved in VoiceXML code. For example, type information for a Form element is used to generate the grammar for that Form. However, the VoiceXML code simply needs to reference the generated Grammar File and is not concerned with the type information itself. Thus, the mapping of the Form element to equivalent VoiceXML code does not include the type information.

To facilitate the reverse translation from VoiceXML code to dialog, the dialog transformer 204 modifies the VoiceXML code by inserting additional attributes into various element tags, providing dialog element information that cannot be stored using the available VoiceXML tags. The resulting file 214 is effectively in an extended VoiceXML format. The additional attributes are stored in a separate, qualified XML namespace so that they do not interfere with the standard VoiceXML elements and attributes, as described in the World Wide Web Consortium's (W3C) Namespaces in XML recommendation. This facilitates the parsing of extended VoiceXML files.

Specifically, an extended VoiceXML file can include the following namespace declaration:
 <vxml version="1.0" xmlns:lq="http://www.telstra.com.au/LyreQuest">

This defines a namespace prefix "lq" as bound to the universal resource indicator (URI) http://www.telstra.com.au/LyreQuest. Subsequently, the file may contain the following extended VoiceXML:

```
<form id="SUBROUTINECALL_getMembership"
    lq:element="SubroutineCall"
    lq:name="getMembership"
    lq:calls="sub1.vxml#getMembershipsub">
  <subdialog name="subcall"
      src="sub1.vxml#SUBROUTINE_getMembershipsub">
    <filled>
      <assign name="getMembership.enrich_membership"
          expr="subcall.enrich_membership" lq:element="Output"/>
    </filled>
  </subdialog>
  <block name="link">
    <goto next="#REMOTE_book_flight">
  </block>
</form>
``` where the indicated XML tag attributes provide the additional dialog element information, and the remaining code is standard VoiceXML. The additional or extended attributes include the lq namespace prefix. The lq:element, lq:name, and lq:calls attributes indicate, respectively, the dialog element that the VoiceXML corresponds to, the name given to that element by the user, and the package and name of the Subroutine element that is being called by the SubroutineCall element. Other elements will have different extended attributes.

The equivalent code in VoiceXML omits the extended attributes, but is otherwise identical:

```
<form id="SUBROUTINECALL_getMembership">
    <subdialog name="subcall"
        src="sub1.vxml#SUBROUTINE_getMembershipsub">
      <filled>
        <assign name="getMembership.enrich_membership"
            expr="subcall.enrich_membership"/>
      </filled>
    </subdialog>
    <block name="link">
      <goto next="#REMOTE_book_flight"/>
    </block>
</form>
```

Two extended VoiceXML files, including all the available extended attributes, are listed in Appendix B.

When the application is saved, the dialog transformer 204 also generates a number of other files, including a project file 216, package description files 218, and type description files 220. The project file is given a filename extension of ".lqx", and contains information about the packages (i.e., self-contained groups of files) and other data files making up a project of the voice application development system 100.

An example project file is listed below. Within the project file, the project is defined by a "project" XML element that defines the project name as "mas". Within the "project" element are four sequential "folder" elements that define subdirectories or folders of the directory containing the project file, respectively named Packages, Transcripts, Scenarios, and Generated Code. These folders contain respectively the project's packages, transcripts of text, scenarios of interaction between the corresponding application and a user, and VoiceXML code and grammar generated for one or more specific IVR platforms. Within the "Packages" folder element is a "package" element giving the location and name of any packages used by the project. The "folder" elements can contain one or more "file" elements, each defining the type and name of a file within the encapsulating folder. The "folder" elements can be nested.

```
<?xml version="1.0"?>
<project name="mas">
    <folder name="Packages" directory="packages">
        <package directory="mas" file="mas.pkg.xml"/>
    </folder>
    <folder name="Transcripts" directory="transcripts">
        <file type="transcript" name="mas.in"/>
        <file type="negative" name="mas .negative"/>
    </folder>
    <folder name="Scenarios" directory="scenarios">
        <file type="scenario" name="mas.scen"/>
        <file type="states" name="mas.states"/>
    </folder>
    <folder name="Generated Code" directory="deploy">
        <folder name="JSGF Code" directory="jsgf">
        </folder>
        <folder name="Nuance Code" directory="nuance">
        </folder>
    </folder>
</project>
```

A package description file is given a filename extension of ".pkg.xml", and contains information about data files belonging to an individual Package of a project. An example of a package description file for the package named "mas" is given below. The file defines the project's dialog file as "mas.vxml", four grammar files, four prompt files, and three type definition files, containing definitions of user-defined variable types. These files are described in more detail below.

```
<?xml version="1.0"?>
<package name="mas">
<file type="dialog" name="mas.vxml"/>
<file type="grammar">
    <file type="rulelist" name="mas.rulelist"/>
    <file type="cover" name="mas.cover"/>
    <file type="slots" name="mas.slots"/>
    <file type="targets" name="mas.targets"/>
</file>
<file type="prompt">
    <file type="rulelist" name="mas.prompts.rulelist"/>
    <file type="cover" name="mas.prompts.cover"/>
    <file type="slots" name="mas.prompts.slots"/>
    <file type="targets" name="mas.prompts.targets"/>
</file>
<file type="typedef" name="cities.type.xml"/>
<file type="typedef" name="fare_class.type.xml"/>
<file type="typedef" name="collection_point.type.xml"/>
</package>
```

A Type description file is given a filename extension of ".type.xml", and contains information about a user-defined Type used in a Package of a project. An example of the file is given below. The file defines an enumerated type named "fare_class" with three possible values: "first", "business", and "economy". The "fare_class" type is associated with four files, respectively defining rules for the grammar, cover (a set of example phrases), slots (the parameter=value fields that the grammar can return), and targets (more specific slot filling information).

```
<?xml version="1.0" encoding="utf-8"?>
<types>
    <enum name="fare_class">
        <file type="grammar">
            <file type="rulelist"
                name="fare_class.rulelist"/>
            <file type="cover" name="fare_class.cover"/>
            <file type="slots" name="fare_class.slots"/>
            <file type="targets" name="fare_class.targets"/>
        </file>
        <item name="first"/>
        <item name="business"/>
        <item name="economy"/>
    </enum>
</types>
```

Returning to FIG. 3, in order to deploy the application on the WR 102, the application dialog is translated into VoiceXML by the application builder 206 at step 604. In addition to the dialog, voice applications require grammar and prompts. The application builder 206 generates grammar files 222 and prompts files 224 automatically, using information specified by the user and stored in the dialog, such as prompt wordings and Form input types. This information is supplied by the user entering typical phrases for 'mixed initiative' recognition (i.e., input containing multiple pieces of information). By applying generalisation methods to these phrases, a combinator module of the application development modules 210 generates a starting grammar set capable of handling a large number of input phrases. The application builder 206 also invokes the dialog transformer 204 to create the extended VoiceXML file 214. The grammar 222 and prompts 224 files are used by the IVR code generator 208 to generate VoiceXML 226 for the IVR 102.

A generated grammar file is given a filename extension of ".rulelist". An example of a generated grammar file for a flight booking system is:

```
.Ask_flight_details_destination Cities:X 2 0 destination=$x.cities
.Ask_flight_details_departure_point Cities:X 2 0
departure_point=$x. cities
.Ask_flight_details_ticket_class Fare_class:X 2 0
ticket_class=$X.fare_class
.Ask_flight_details_date Date:X 2 0 date.day=$X.date.day
date.year=$X.date.year date.day_of_week=$X.date.day_of_week
date.month=$X.date.month date.modifier=$X.date.modifier
.Form_flight_details booking 2 1
.Ask_book_flight_confirmation Confirmation:X 2 0
confirmation=$X.confirmation
.Ask_get_enrich_number_enrich_number Digitstring:X 2 0
enrich_number=$X.digitstring
.Ask_get_collection_point_collection_point Collection_point:X 2 0
collection_point=$X.collection_point
.Ask_another_flight_second_flight Confirmation:X 2 0
second_flight=$X.confirmation
.Ask_get_number_get_number_for_balance Digitstring:X 2 0
get_number_for_balance=$X.digitstring
.Menu_main_menu_booking Booking 2 0
! !Booking booking 3 0
! !Booking 1 0
.Menu_main_menu_membership Membership 2 0
! !Membership membership 3 0
! !Membership 1 0
.Form_flight_details GF_IWantTo:X738 book a Fare_class:X741
class ticket to Cities:X745 from Cities:X747 on Date:X749 2 1
date.day=$X749.date.day
date.year=$X749.date.year ticket_class=$X741.fare_class
date.day_of_week=$X749.date.day_of_week
date.month=$X749.date.month departure_point=$X747.cities
destination=$X745.cities date.modifier=$X749.date.modifier
```

```
.Form_flight_details GF_IWantTo:X750 book a Fare_class:X753
class ticket to Cities:X757 2 1 ticket_class=$X753.fare_class
destination=$X757.cities
```

The first line or rule of this grammar can be used as an example:

.Ask_flight_details_destination Cities:X 2 0 destination=$X.cities

This grammar rule might be invoked when a flight booking application prompts a customer to provide the destination of a flight. The first field, .Ask_flight_details_destination, provides the name of the grammar rule. The second field, Cities: X, indicates that the customer's response x is of type Cities. This type is defined by its own grammar that includes a list of available city names. The following two fields, 2 0, are used for grammar learning, as described in International Patent Publication No. WO 00/78022, A Method of Developing ant Interactive System. The first field indicates the number of training examples that use the grammar rule. The second field indicates the number of other rules that refer to the rule. The last field, destination=$X.cities, indicates that the result of the rule is that the parameter destination is assigned a value of type Cities having the value of x. A more complex example is provided by the last rule:

.Form_flight_details GF_IWantTo:X750 book a Fare_class: X753 class ticket to Cities:X757 2 1 ticket_class=$X753.fare_class destination=$X757.cities In this case, the grammar rule invokes three other grammars: GF_IwantTo, Fare_class, and Cities and assigns the results to parameters named X750, X753, and X757, respectively. This rule defines the application parameters ticket_class and destination.

A prompts file is given a filename extension of ".prompts.rulelist", and each line of the file defines the speech prompt that is to be provided to a user of the application when the corresponding element of the dialog is executed. An example of a generated prompts file is:

```
.Goodbye thank you for using this application. goodbye. 1 1
.Noinput sorry, i did not hear anything. 1 1
.Nomatch sorry, i did not understand you. 1 1
.Ask_flight_details_destination where would you like to go 1 1
.Ask_flight_details_destination_2 please say the destination city name 1 1
.Help_Ask_flight_details_destination please say the destination. 1 1
.Ask_flight_details_departure_point where would you like to fly from 1 1
.Ask_flight_details_departure_point_2 please say the departure point 1 1
.Help_Ask_flight_details_departure_point please say the departure point. 1 1
.Ask_flight_details_ticket_class what class would you like to fly 1 1
```

The format of the prompts file is the same as the grammar file. This allows the prompts to be improved through machine learning as though they were a grammar, using a grammar learning method such as that described in International Patent Publication No. WO 00/78022, A Method of Developing an Interactive System.

The generated prompts include dynamically prompts. An example of a dynamic prompt is: "You have selected to buy Telstra shares. How many of the Telstra shares would you like to buy?". The word, "Telstra" is dynamically inserted into the application's prompt to the user.

The voice application development system 100 generates text-to-speech (TTS) prompts within the VoiceXML code that are evaluated on the fly. Although VoiceXML syntax allows an expression to be evaluated and played as a TTS prompt, the system 100 extends this by allowing an ECMAscript or JavaScript function to be called to evaluate each variable used in a prompt. By evaluating variables in a function rather than as an inline expression, complex test conditions can be used to determine the most suitable prompt given the available information in the variables. This might result in a prompt, for example, of "six dollars" rather than "six dollars and zero cents". In addition to automatically generating and incorporate JavaScript function calls in VoiceXML, the system 100 also generates the corresponding JavaScript functions by incorporating user-supplied prompt text and variables into the JavaScript templates 230. This allows the user to develop a voice application with dynamically generated prompts without having to manually code any JavaScript.

For example, an automatically generated function call for a prompt named PromptConfirm_payment_details is:

```
<field name="confirm">
    <grammar src="mas.gsl#Confirm"/>
    <prompt>
        <value expr="PromptConfirm_payment_details(
            payment_details.company,
            payment_details.amount,
            payment_details.payment_date)"/>
    </prompt>
```

The corresponding JavaScript prompt function generated by the system 100 is:

```
function PromptConfirm_payment_details(company,amount,
payment_date)
{
    var result;
    result =   "the company is " + Bpay_names(company) +
               "the amount is " + Money(amount) +
               "the payment date is " + Date(payment_date) +
               "is this correct? ";
    if( valid_string(result))
    {
        return result;
    }
    ;
        return result;
}
```

The system 100 represents prompts using a language model that describes all of the prompts that can be played, along with their meanings. This model contains the same type of information as a speech recognition grammar, and therefore the prompts to be played can be represented using a grammar. Prompts to be generated by the application are first represented as a grammar to enable that grammar to be improved using techniques such as grammar learning, as described in International Patent Publication No. WO 00/78022, A Method of Developing an Interactive System. The grammar is subsequently converted into JavaScript and referenced by the application's VoiceXML tags, as described above.

An example of a prompt represented as a grammar is:

```
.Confirm_payment_details the company is Bpay_names:x1 the amount is
Money:x2 the payment date is Date:x3 is this correct? 1
company=$x1.company amount.dollars=$x2.amount.dollars
amount.cents=$x2.amount.cents payment_date=$x3.payment_date
```

Returning to FIG. 3, after the application has been built at step 604, that is, the extended VoiceXML 214, the grammar 222 and the prompts 224 for the application have been generated by the application builder 206, the application can be tested and further developed at steps 606 to 610. Steps 606, 608, 610 and 612 can be executed in any order. At step 606, the application can be simulated and refined. This involves simulating the execution of the application and refining its accuracy by allowing the user to tag phrases that do not match the existing grammar. When user input during testing does not match the grammar, a dialog box is displayed, allowing the user to tag the phrase and supply the correct 'slot' or slots corresponding to that input. A slot is a parameter=value pair for the application, such as "fare_class=business". A grammar learner module of the application development modules 210 then uses a transcript of the simulation to update the application grammar 222. New phrases learnt from this grammar are then displayed to the user, who can manually tag individual phrases as being incorrect. At step 608, the grammar capabilities of the application can be further improved by a Train Grammar tool of the application development modules 210. This is similar to the simulate and refine module, but allows the user to enter a list of typical user responses for each application prompt. At step 610, a Generate Scenarios module of the application development modules 210 generates scenarios of possible interactions between the application and a human. Based on these scenarios, the user can determine whether and application prompts need improvement.

Figure 6:
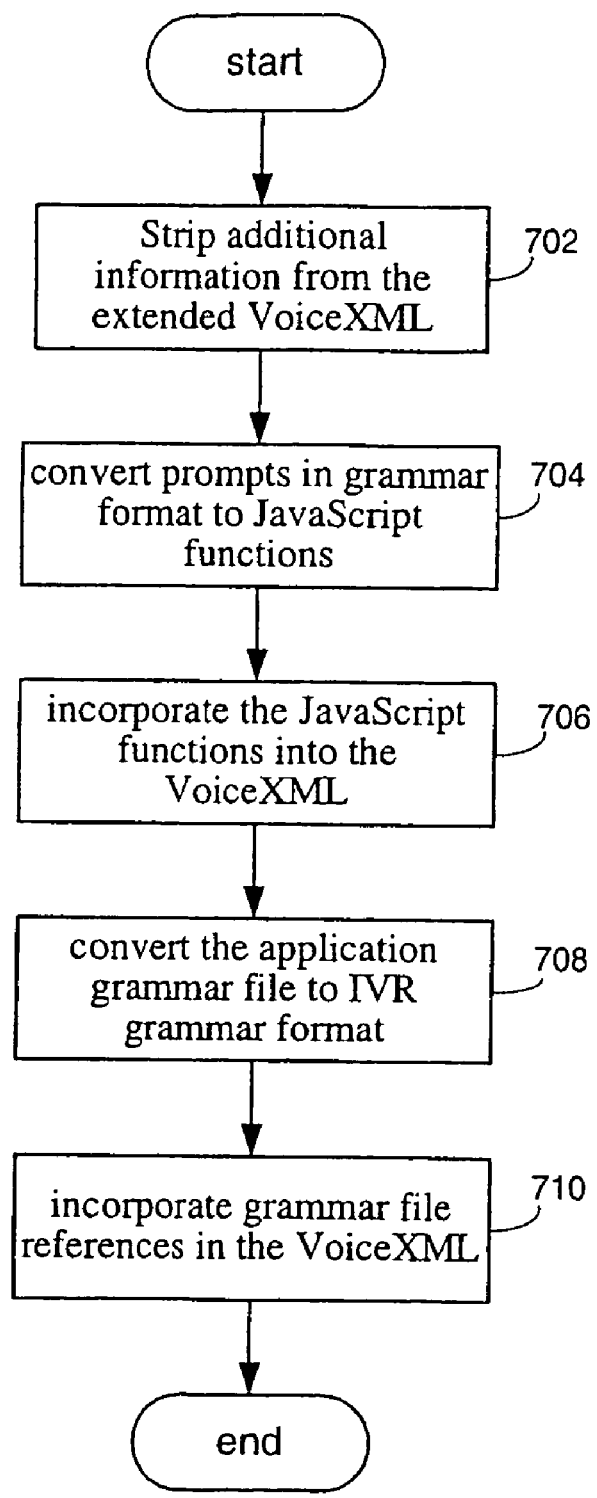
FIG. 6 is a flow diagram of a code generation process executed by the system.

When the application has been tested and is ready for use, the IVR code generator 208 executes a code generation process at step 612 to generate pure VoiceXML suitable for a particular speech-enabled IVR such as the IVR 102 of FIG. 1. As shown in FIG. 6, the code generation process begins at step 702 by removing the extended attributes from the extended VoiceXML file 214 to generate pure VoiceXML. At step 704, prompts (including dynamic prompts) in the prompt file 224 are converted into JavaScript functions. At step 706, these JavaScript functions are incorporated into the pure VoiceXML by adding references to the functions in VoiceXML tags, and adding the functions themselves to the pure VoiceXML. At step 708, the IVR grammar file 228 is generated by translating the application grammar file 222 into a grammar format supported by the desired IVR platform, such as Nuance™ GSL or generic VoiceXML 1.0 JSGF grammar format, as selected by the user. Other grammar formats can be supported in the same way. At step 710, references to the IVR grammar file 228 are incorporated into the pure VoiceXML. The result is the pure VoiceXML file 226. The VoiceXML file 226 and the IVR grammar file 228 are sufficient to deploy the voice application on the IVR 102.

For the purposes of illustration, Appendix C provides a partial listing of a pure VoiceXML file corresponding to the first extended VoiceXML file listed in Appendix B. The listing in Appendix C includes the VoiceXML with the merged JavaScript for supporting Prompts. The JavaScript code is at the end of the listing.

Many modifications will be apparent to those skilled in the art without departing from the scope of the present invention as herein described with reference to the accompanying drawings.

APPENDIX A: DIALOG ELEMENTS

Decision

| | |
|---|---|
| Description: | A point in the dialog where a decision is made to determine which path of execution should continue. |
| Notes: | Each Decision element is followed by one or more Decision-Branch elements. |
| Parameters: | Decision<br>Name: a name for this Decision element |

Decision branch

| | |
|---|---|
| Description: | A path that is followed if the condition is true. |
| Notes: | Can only be added after a Decision element. |
| Parameters: | Branch<br>Condition: an ECMAScript expression that if evaluated to true will cause execution to continue down this branch, eg. x == 2, validity == true, currency == 'AUD'.<br>Note that strings should be quoted in single quotes. An "else" condition is created by enabling the Otherwise checkbox. |

Menu

| | |
|---|---|
| DESCRIPTION: | Prompts the user to select from a series of menu choices |
| Notes: | Each Menu element is followed by one or more Menu-Choice.<br>Prompts for the menu can include:<br>(1) Auto generated prompts (by default);<br>(2) User specified prompts;<br>(3) Audio file for playing prompts.<br>In addition, tapered prompts are supported. |
| Parameters: | Menu<br>Name: name for this Menu element.<br>Prompts<br>Tapered prompts: the tapered prompts played to ask for a menu choice. The system can generate a default text prompt based on the menu choices and a default audio file name for recording the corresponding audio prompt, or you may enter in your own values. If an audio prompt is not required, the "Generate default audio file name" checkbox should be unchecked and the "Audio file" text box should be left empty.<br>Help prompt: the prompt played when the user requests help. As with tapered prompts, the system can generate a default text prompt and audio file name, or you may enter in your own. |

---
Menu choice 
---

| | |
|---|---|
| Description: | Defines a specific menu choice |
| Notes: | Can only be added after a Menu element. This is the only Element whose name can have a space. |
| Parameters: | Choice<br>Choice: a word or phrase for this menu choice. |

---
Form 
---

| | |
|---|---|
| Description: | Collects user inputs to fill in a 'form'.<br>Defines a type and prompts for each input.<br>These can be standard types such as Time and Date, or user defined such as a list of products. |
| Notes: | User-defined-types need to be first created in the LHS Dialog/Project Files window, by right-clicking on 'package' icon.<br>Selecting "Hot link" allows jumping to the Form from anywhere in the dialog.<br>The Forms support mixed initiative filling of the Fields.<br>Other Elements can refer to Form Fields using: "FormName.FieldName".<br>When entering Form Fields, default string values need to be in single quotes (eg. 'telstra'). |
| Parameters: | Form<br>Name: a name for this Form element. An object with this name will be created to store the form fields. Each field can then be accessed as $formName.$fieldName, eg. BuyForm.price.<br>Modal: if enabled, then only that input field's grammar is enabled when collecting each field; all other grammars are temporarily disabled (including hot-linked global grammars). This means that you cannot get out of this form by saying a hotword. For example, a form that collects a login pin should be made modal.<br>Confirm All: enable confirmation of all form fields together at the end.<br>Hot link: enable jumping to the form from anywhere in the document, by creating a document grammar for the form.<br>Input Field<br>Name: name of slot to be filled.<br>Type: type of slot value.<br>Default: default value for slot. If a default is given, the user will not be prompted for the field. If the field type is a structured object, the slot will have multiple properties, one for each of the object's properties. You may specify a default by filling in some or all of these properties, depending on what is valid for a particular type. Note that strings should be quoted in single quotes, eg. 'wednesday'.<br>Confirm: enable individual confirmation of this field. This is in addition to the form confirmation of all fields at the end.<br>Input Field Prompts<br>Tapered prompts: the tapered prompts played to collect input for this field. The system can generate a default text prompt based on the field name and a default audio file name for recording the corresponding audio prompt, or you may enter in your own values. If an audio prompt is not required, the "Generate default audio file name" checkbox should be unchecked and the "Audio file" text box should be left empty.<br>Help prompt: the prompt played when the user requests help. As with tapered prompts, the system can generate a default text prompt and audio file name, or you may enter in your own. |

---
Record 
---

| | |
|---|---|
| Description: | Captures a voice recording from the user |
| Notes: | Note that the Record duration is in seconds. Setting it to too high will result in excesive memory usage & possible harddisk limit problems. |
| PARAMETERS: | Record<br>Name: a name for this Record element.<br>MIME-type: MIME-type storage format for the recording. This field may be left blank if the IVR does not allow a MIME-type specification. Please consult your IVR documentation for supported MIME-types.<br>Beep: enable a beep to be sounded before recording starts.<br>DTMF Terminate: enable a DTMF key press to terminate the recording.<br>Duration: maximum recording time in seconds.<br>Confirm: enable confirmation of the recorded material.<br>Prompt: the prompt played to ask for a recording. The system can generate a default text prompt and a default audio file name for recording the corresponding audio prompt, or you may enter in your own values. If an audio prompt is not required, the "Generate default audio file name" checkbox should be unchecked and the "Audio file" text box should be left empty. |

Speaker 

| | |
|---|---|
| Description: | Plays TTS & audio to the caller. |
| Notes: | Can say variables of predefined types, such as Date, Money, etc. The variables need to be declared as a valid object (unless it is created via a Form Field). Eg. User can use local processing to declare a variable called price, as follows: price = new Object(); price.dollars = 10; price.cents = 4; To use it in Speaker, type the following: PromptMoney(price) in a Speaker expression fragment. |
| | To play back predefined Types, such as Money: |
| | (1) add a Speaker fragment of the type "Expression"; |
| | (2) enter in the "Expression" text box: PromptType(x), where Type is the predefined type name, x is the variable of the predefined type. E.g. If "y" is type money (where y.dollars = 5 y.cents = 0), then entering PromptMoney(y) will result in the following being played: "five dollars". |
| Parameters: | Speaker |
| | Name: a name for this Speaker element. |
| | Fragment |
| | Type: type of prompt fragment. |
| | Text: a fixed text fragment. The text specifies text-to-speech (TTS) that should be played. The audio file URL specifies a recording that should be played, in precedence to the text-to-speech, eg. greeting.wav, http://server/welcome.wav. Either of the audio file or the text may be left empty to request that only TTS or audio with no alternate text should be played. |
| | Expression: an evaluated prompt fragment. The ECMAScript expression is evaluated and played as text-to-speech (TTS), eg. recordedMessage, counter + 1. To play back a variable of a known type, you should use the function PromptType(x), where Type is the name of that type, and x is the name of the variable, eg. PromptMoney(BuyForm.price). This is particularly important for playing back structured types. The audio expression is evaluated and retrieved as an audio file URL for playing, eg. company + '.wav'. The expressions may reference any variable defined in the package, such as in a Variables element or a Form object. Either of the audio expression or the TTS expression may be left empty to request that only TTS or audio with no alternate text should be played. |

Local Processing 

| | |
|---|---|
| Description: | Local computation. |
| Notes: | This can be any ECMAScript code, eg. functions, statements, function calls. Any variable declared in the dialog may be accessed, eg. declared Variables, Form fields, SubroutineCall outputs, RemoteProcessing outputs. |
| Parameters: | Local Processing |

-continued

Local Processing 

| | |
|---|---|
| | Name: a name for this Local Processing element. ECMAScript: any arbitrary ECMAScript code, such as variable declarations, if blocks, assignment statements, function declarations and function calls, eg. x = x + 1; currency = 'AUD';. Note that strings should be quoted in single quotes. |

Remote Processing 

| | |
|---|---|
| Description: | Call a server-side script (via a HTTP URL) to perform some processing. The script should return a VoiceXML document with the results of the processing. |
| NOTES: | Need PHP/CGI running on remote Web server to handle this. Name of the input and output parameters needn't be declared in the Variables element. The names of the input and output parameters should match what is required at the remote server end. Other Dialog Elements can refer to the output of the Remote Processing element using: "RemoteProcName.outputName". |
| Parameters: | Remote Processing |
| | Name: a name for this Remote Processing element. An object with this name will be created to store the returned outputs. Each output can then be accessed as $remoteProcessingName.$output, eg. ValidatePin.validity |
| | Source URL: the URL of the remote script to execute, eg. http://server/cgi-bin/script1. |
| | Input |
| | Name: name of the input parameter to be submitted, eg. price. This is the name that the server script expects. |
| | Value: value of the input parameter to be submitted, eg. BuyForm.price, 1, 'AUD', true, x + 1. This may be any valid ECMAScript expression. The expression may reference any variable defined in the package, such as in a Variables element or a Form object. If the value is an ECMAScript object with fields f1, f2, . . . , then the object is serialised and submitted |

-continued

Remote Processing 

using the names o.f1, o.f2, . . . , assuming o is the declared input name.
Output
Name: name of each parameter returned by the remote script, eg. outField1. The remote script should return a VoiceXML document containing a subdialog form whose return namelist includes all these output fields.

Loop Call 

| | |
|---|---|
| Description: | Calls a Loop to execute a part of a dialog that should be iterated several times. |
| Notes: | A corresponding Loop element is required. |
| Parameters: | Loop Call
Name: a name for this Loop Call element.
Source: the loop to call. The loop must be defined in this package. |

End 

| | |
|---|---|
| Description: | Terminate the call. End of dialog |
| Notes: | |
| Parameters: | Causes execution to terminate immediately |

Transfer 

Description: Transfer the call to another number.

Subroutine Call 

| | |
|---|---|
| Description: | Start a subroutine. Used for breaking bigger programs into smaller components, for ease of readability, reuse of code, and support of pre-packaged code. |
| Notes: | A corresponding Subroutine element is required. Input parameter names needn't be declared. Ouput parameter names are set by the Subroutine element. Other Dialog Elements can refer to the output parameters by calling: "SubroutineCallName.OutputParamName". |
| Parameters: | Subroutine Call
Name: a name for this Subroutine Call element. An object with this name will be created to store the returned outputs. Each output can then be accessed as $subName.$output, eg. ValidatePin.validity.
Source: the subroutine to call (qualified with the package name). If the declared subroutine inputs and outputs have changed, you may need to reselect the subroutine from the Source list box to refresh the displayed inputs and outputs.
Inputs
This is a list of the inputs that the called subroutine expects. For each input, you must specify an ECMAScript expression whose value will be passed to the subroutine, eg. 0, BuyForm.price, pinValidity, 'AUD'. It may reference any variable defined in the package, such as in a Variables element or a Form object. Note that strings should be quoted in single quotes. Note also that you cannot leave any input value blank.
Outputs
This is a list of the outputs that the called subroutine returns. |

Jump 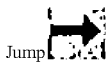

| | |
|---|---|
| Description: | Jump to a predefined block. Can jump to any element in the same MainDialog or Subroutine that has a name. |
| Notes: | Valid destinations for Jump: (1) Jumps within a MainDialog; (2) Jump from a Loop in a MainPackage to the MainDialog; (3) Within a subroutine. |
| Parameters: | Jump
Destination: the destination element to jump to. You can only jump within a main dialog or within a subroutine. You cannot jump to an element in a loop or in another package. The available elements to jump to are presented in the drop-down list box. |

-continued

| | |
|---|---|
| Notes: | |
| Parameters: | Transfer
Name: a name for this Transfer element.
Destination: a number to dial or an ECMAScript expression that evaluates to such a number. A valid number is a string of digits with optional spaces, eg. 1234567, 03 1234567. The number may optionally contain a protocol specifier. Please consult your IVR documentation for specific supported number formats.
Connection Timeout: maximum time in seconds to wait for a connection before a failure is reported. |

Loop Break 

Description: Used within a Loop to break out of the loop.
Notes: Only valid within a Loop
Parameters: Causes execution to break out of the loop immediately. The loop exit message, if any, is not played Loop Next 

Description: Used within a Loop to indicate the end of one iteration.
Notes: Only valid within a Loop
Parameters: Causes execution of the next iteration of the loop, if the loop test condition evaluates to true. The loop step is executed before the condition is evaluated.

Subroutine Return 

Description: Return from subroutine
Notes: Only valid within a Subroutine
Parameters: Return from a subroutine call.

Variables 

Description: Declare "global" variables that can be accessed from anywhere within this Package, eg. inside a Loop, LocalProcessing, Speaker element.
Notes: Form Fields, Subroutine Call outputs and Remote Processing outputs do not need to be declared. They are automatically created.
Parameters: Variables
Name: a name for the variable. The name should be unique within this package.
Value: an ECMAScript expression, usually a constant, that sets the initial value for the variable, eg. 0, 'cat', true. Note that strings should be quoted with single quotes. The value may be left empty to create an ECMAScript undefined value.

Hotwords 

Description: Create "hot words" that transition the user to a specified point in the dialog when they are uttered by the user.
Notes: Allows the user to jump from one part of the dialog to another if they want to do something else, for example. Hotwords can only be created in the Main Package, not in Subroutine Packages.
Parameters: Hotwords
Hotword: a word or phrase that will trigger a jump.
Destination: the destination element to jump to.

Start Dialog 

Description: The entry point for the application.
Notes: This is automatically created when you create a new project. Only the first package has a Start Dialog element. Each project must have one and only one Start Dialog element. You cannot add more Start Dialogs, nor delete any.
Parameters: Start Dialog
This is the entry point for the application.
Name: a name for this Start Dialog element.
Quit Prompt: the prompt played when the user has requested to quit, after which the dialog will terminate. The system can generate a default text prompt and a default audio file name for recording the corresponding audio prompt, or you may enter in your own values. If an audio prompt is not required, the "Generate default audio file name" checkbox should be unchecked and the "Audio file" text box should be left empty.
No Input Prompt: the prompt played when no input is detected while the user is being asked for a response. The user is then reprompted for a response. As with the Quit prompt, the system can generate a default text prompt and a default audio file name, or you may enter in your own values.
No Match Prompt: the prompt played when the detected user response cannot be recognised by the system. The user is then reprompted for another response. As with the Quit prompt, the system can generate a default text prompt and a default audio file name, or you may enter in your own values.

Subroutine 

| | |
|---|---|
| Description: | This is the entry point for a subroutine. |
| Notes: | Subroutine elements cannot be added to the Main Package. They can only be added to non-Main Packages. More than one Subroutine can be added to a non-Main Package. However, all Subroutine inputs and outputs must be unique within the Package, ie. no two Subroutines can declare the same input name or output name. Furthermore, no input name can be the same as an output name.<br>The Subroutine element is created by (1) right-clicking on the "Project" icon on the Dialogs/Project Files window (LHS) to add a new Package; and (2) right-clicking on a Package icon on the Dialogs window (LHS) to add a new Subroutine.<br>Each path in the Subroutine should end with a Return element, otherwise the Subroutine will not return to the calling dialog. |
| Parameters: | Subroutine<br>Name: a name for this Subroutine element.<br>Input<br>Name: name of each input parameter expected, eg. pin. The input will be declared as a document variable that you can access from anywhere within the package. You do not need to (re)declare it under the Variables element.<br>Output<br>Name: name of each return parameter, eg. validity. The output will be declared as a document variable that you can access from anywhere within the package. You do not need to (re)declare it under the Variables element. |

Loop 

| | |
|---|---|
| Description: | A portion of the dialog that should be executed several times. |
| Notes: | The Loop element is created by right-clicking on the Package icon on the Dialogs window (LHS). Variables are freely shared between the Loop body and the main dialog (of the same Package) as they are in one VoiceXML document. |
| Parameters: | Loop<br>Name: a name for this Loop element.<br>Loop Test: an ECMAScript expression that if evaluated to true will cause execution of the next iteration of the loop, eg. counter < 5.<br>Test at start: If enabled, the test condition is evaluated at the start of the loop and the loop is equivalent to a while/for loop. If disabled, the loop body is executed before the test condition is evaluated and the loop is equivalent to a do-while loop.<br>Exit message: a message to be played when the loop exits normally, eg. there are no more items. The system can generate a default text prompt and a default audio file name for recording the corresponding audio prompt, or you may enter in your own values. If a message is not required, the "Generate default..." checkboxes should be unchecked and the "Audio file" and "TTS" text boxes should be left empty.<br>Loop Init<br>Variables to be initialised at the start of the loop.<br>Name: name of a variable, eg. counter. The variable must have been created elsewhere, such as in the Variables element.<br>Value: an ECMAScripz expression that sets the initial value for the variable, eg. 0.<br>Loop Step<br>Variables to be incremented before another iteration of the loop. The increment occurs before the test condition is reevaluated.<br>Name: name of a variable, eg. counter.<br>Value: an ECMAScript expression to increment the variable, eg. counter + 1. |

The invention claimed is:

1. A process for developing a voice application, including:
generating graphical user interface components for defining execution paths of a voice application by arranging dialog elements in a tree structure, each path through said tree structure representing one of said execution paths, said dialog elements having user configurable properties and corresponding to respective predetermined sequences of VoiceXML elements;
receiving user input generated by user interaction with said graphical user interface components;
processing said user input to define a voice application by selecting dialog elements representing components of said voice application, configuring properties of the selected dialog elements, and defining execution paths of said voice application as respective sequences of at least a subset of the selected dialog elements; and
generating voice application code for said application, said application code representing each dialog element of said voice application as a sequence of VoiceXML elements including extended attributes to allow said tree structure of said application to be determined.

2. A process as claimed in claim 1, wherein said extended attributes are qualified names of a qualified XML namespace.

3. A process as claimed in claim 1, wherein each dialog element of said application code includes a reference to the next of said dialog elements in an execution path of said application.

4. A process as claimed in claim 1, including processing said application code to generate a visual representation of said dialog elements and said execution paths.

5. A process as claimed in claim 1, wherein said step of generating application code includes generating extended VoiceXML code, prompt data, and grammar data for said application.

6. A process as claimed in claim 5, wherein said prompt data is represented as a grammar, and said process includes improving said grammar.

7. A process as claimed in claim 5, including generating at least one script for generating a prompt for said application on the basis of one or more parameters supplied to said script.

8. A process as claimed in claim 7, wherein said at least one script is generated on the basis of at least one script template and prompt data defined for said prompt by a user.

9. A process as claimed in claim 7, wherein said at least one script includes ECMAscript.

10. A process as claimed in claim 5, including generating VoiceXML code and IVR grammar data for execution of said application on an IVR system on the basis of said extended VoiceXML code, prompt data, and grammar data.

11. A system having components for executing the process of claim 1.

12. A computer readable storage medium having stored thereon program instructions for executing a process for developing a voice application, including executing the steps of:
generating graphical user interface components for defining execution paths of a voice application by arranging dialog elements in a tree structure, each path through said tree structure representing one of said execution paths, said dialog elements having user configurable properties and corresponding to respective predetermined sequences of VoiceXML elements;
receiving user input generated by user interaction with said graphical user interface components;
processing said user input to define a voice application by selecting dialog elements representing components of said voice application, configuring properties of the selected dialog elements, and defining execution paths of said voice application as respective sequences of at least a subset of the selected dialog elements; and
generating voice application code for said application, said application code representing each dialog element of said voice application as a sequence of VoiceXML elements including extended attributes to allow said tree structure of said application to be determined.

13. A system for use in developing a voice application, including:
a dialog element selector configured to define execution paths of said voice application by selecting dialog elements and adding said dialog elements to a tree structure, each path through said tree structure representing one of said execution paths, said dialog elements having user configurable properties and corresponding to respective predetermined sequences of VoiceXML elements;
means for receiving user input generated by user interaction with said dialog element selector;
means for processing said user input to define a voice application by selecting dialog elements representing components of said voice application, configuring properties of the selected dialog elements, and defining execution paths of said voice application as respective sequences of at least a subset of the selected dialog elements; and
a code generator for generating application code for said voice application, said application code representing each dialog element of said voice application as a sequence of VoiceXML elements including extended attributes to allow said tree structure of said voice application to be determined.

14. A system as claimed in claim 13, wherein said selector is adapted to process said application code to generate a graphical representation of said dialog elements and said execution paths of said application.

15. A system as claimed in claim 13, wherein said code generator generates extended VoiceXML code, prompt data, and grammar data for said application.

16. A system as claimed in claim 15, wherein said prompt data is represented as a grammar, and the system includes one or more modules for improving said grammar.

17. A system as claimed in claim 15, including a script generator for generating at least one script for generating a prompt for said application on the basis of one or more parameters supplied to said script.

18. A system as claimed in claim 17, wherein said script generator generates said at least one script on the basis of at least one script template and prompt data defined for said prompt by a user.

19. A system as claimed in claim 15, wherein said code generator generates VoiceXML code and IVR grammar data for execution of said application on an IVR system on the basis of said extended VoiceXML code, prompt data, and grammar data.

20. An extended VoiceXML file generated by the system of claim 13.

21. A graphical user interface for use in developing a voice application, said interface including graphical user interface components associated with executable program code stored on a computer-readable storage medium and processed by a computer system for defining execution paths of said application by arranging dialog elements in a tree structure, each path through said tree structure representing one of said execution paths, said dialog elements having user configurable properties and corresponding to respective predetermined sequences of VoiceXML elements, wherein said dialog elements include at least three of:
a start dialog component for defining the start of said application;
a variables component for use in defining variables for said application;
a menu component for defining a menu;
a menu choice component for defining a choice of said menu;
a decision component for defining a decision branching point;
a decision branch component for defining a test condition and an execution branch of said decision branching point;
a form component for defining a form to collect input from a caller;
a record component for recording audio;
a speaker component for playing prompts;
a local processing component for defining local processing;
a remote processing component for performing processing on a remote system;
a loop component for defining an execution loop;
a loop call component for calling said loop;
a loop next component for proceeding to the next cycle of said loop;
a loop break component for breaking out of said loop;

a subroutine component for defining a subroutine;
a subroutine call component for calling said subroutine;
a subroutine return component for returning from said subroutine;
a jump component for defining a non-sequential execution path to a dialog element;
a transfer component representing the transfer of a call to another number;
a hotwords component for defining a word or phrase and a non-sequential execution path to a dialog element to be followed upon receipt of said word or phrase; and
an end component for defining an end of said application.

22. A computer readable storage medium having application code for a voice application stored thereon for processing by a computer system to cause the computer system to execute the voice application, said application code including a plurality of dialog elements representing components of said voice application, each of said dialog elements being a sequence of VoiceXML elements including extended attributes to allow a tree structure of execution paths of said voice application to be determined, each path through said tree structure representing one of said execution paths.

* * * * *